(12) United States Patent
Honda et al.

(10) Patent No.: US 6,699,602 B2
(45) Date of Patent: Mar. 2, 2004

(54) AMORPHOUS MAGNETIC RECORDING MEDIUM, PROCESS FOR PRODUCING THE SAME AND MAGNETIC RECORDING AND REPRODUCTION APPARATUS

(75) Inventors: Mitsutoshi Honda, Hitachi (JP); Hiroki Yamamoto, Hitachi (JP); Takashi Naito, Mito (JP); Tatsumi Hirano, Hitachinaka (JP); Tetsuo Nakazawa, Tomobe (JP); Fumiyoshi Kirino, Tokyo (JP); Teruaki Takeuchi, Moriya (JP); Akira Yano, Moriya (JP); Nobuyuki Inaba, Hasuda (JP); Satoshi Matsunuma, Kamakura (JP)

(73) Assignee: Hitachi Maxell, Ltd., Ibaraki (JP)

( * ) Notice: Subject to any disclaimer, the term of this patent is extended or adjusted under 35 U.S.C. 154(b) by 153 days.

(21) Appl. No.: 10/084,944

(22) Filed: Mar. 1, 2002

(65) Prior Publication Data

US 2002/0172842 A1 Nov. 21, 2002

(30) Foreign Application Priority Data

Mar. 1, 2001 (JP) .......................... 2001-057001

(51) Int. Cl.$^7$ .............................. G11B 5/66; G11B 5/70; H01J 1/00; B05D 5/12
(52) U.S. Cl. ............................. 428/694 TS; 428/611; 428/633; 428/900; 427/128; 427/129; 427/130; 427/131; 204/192.1; 204/192.2; 360/97.01
(58) Field of Search .......................... 428/694 TS, 633, 428/900, 611; 427/128–131; 204/192.1, 192.15, 192.2; 300/97.01

(56) References Cited

U.S. PATENT DOCUMENTS 5,147,732 A * 9/1992 Shiroishi et al. ............ 428/668
6,472,047 B1 * 10/2002 Kirino et al. ............... 428/141

FOREIGN PATENT DOCUMENTS

| JP | A-4-118977 | 4/1992 |
|---|---|---|
| JP | A-6-084216 | 3/1994 |
| JP | A-6-150414 | 5/1994 |
| JP | A-6-259743 | 9/1994 |
| JP | A-8-221744 | 8/1996 |
| JP | A-11-001667 | 1/1999 |
| JP | A-11-110732 | 4/1999 |
| JP | A-2000-067425 | 3/2000 |
| JP | A-2000-298888 | 10/2000 |

* cited by examiner

*Primary Examiner*—Holly Rickman
(74) *Attorney, Agent, or Firm*—Antonelli, Terry, Stout & Kraus, LLP (57) ABSTRACT

An amorphous magnetic recording medium comprising a substrate and an amorphous magnetic layer, where a magnetic domain formation-controlling layer comprising a main phase and 1 to 3 kinds of discrete spherical isolating phases arranged horizontally in lines in the main phase or 1 to 3 kinds of discrete spherical phases vertically stacked one upon another in the main phase is formed on the top side or the bottom side directly or through at least one of other layers to bring the amorphous magnetic layer into a finer magnetic domain structure, can satisfy high density recording.

16 Claims, 5 Drawing Sheets

AMORPHOUS MAGNETIC RECORDING MEDIUM, PROCESS FOR PRODUCING THE SAME AND MAGNETIC RECORDING AND REPRODUCTION APPARATUS

BACKGROUND OF THE INVENTION

The present invention relates to a magnetic recording medium, and particularly to a magnetic recording medium capable of satisfying high density recording and a process for producing the same, and a magnetic recording and reproduction apparatus with the amorphous magnetic recording medium mounted thereon.

With recent progress of diversification of data such as graphics, animation image data, document data, etc., a huge volume of information must be processed. To satisfy processing of such a huge volume of information, it is the most important technical problem in the field of hard discs (magnetic recording and reproduction apparatus) to enhance the surface recording density.

In case of magnetic recording media which shoulders the responsibility of the magnetic recording and reproduction apparatuses as one essential member, it is imperative to reduce the size of magnetic grains to attain the high density recording. However, when the sizes of magnetic grains are reduced to 3 nm or less, depriving of magnetic properties from the once magnetized magnetic grains by thermal energy at room temperature, i.e. so called thermal demagnetization (phenomenon of reduction in magnetism by heat) will be particularly a problem. To prevent the thermal demagnetization, it is necessary to narrow the grain size distribution so as not to form magnetic grains of extremely small grain sizes.

JP-A-6-259743 discloses a method of narrowing the grain size distribution of magnetic grains by using a metal oxide as a metal oxide underlayer; where the grain size distribution of magnetic grains in the magnetic layer is narrowed by providing a metal oxide underlayer by deposition (including vapor deposition and sputtering).

It has been also proposed to make the magnetic layer amorphous to control the magnetic domain of the amorphous magnetic layer to a finer structure. For example, a method of vapor depositing or sputtering amorphous magnetic layers of different magnetic properties (JP-A-2000-67425) and a method of roughening the substrate (JP-A-6-84216).

However, to make epitaxial growth of a magnetic layer of narrow grain size distribution on the underlayer in said JP-A-6-259743, it is necessary to orientate the metal oxide, but the orientation of metal oxide is destroyed, depending on slight deviation from set conditions of a sputter or deviation from a target film composition, resulting in a failure of epitaxial growth of a magnetic layer as an overlayer.

In case of future high density recording such as 40–80 Gb/inch$^2$, the grain sizes will be much smaller, e.g. about 5 nm, and grains of such very smaller grain sizes will be less crystalline, so that it will be very hard to maintain the epitaxial relation.

On the other hand, both said methods of controlling magnetic domains of the amorphous magnetic layer, that is, the method of vapor depositing or sputtering amorphous magnetic layers of different magnetic properties (JP-A-2000-67425) and the method of roughening the substrate (JP-A-6-84216), have not succeeded yet in magnetic domain structure control capable of satisfying the desired 60 Gb/inch$^2$.

SUMMARY OF THE INVENTION

An object of the present invention is to provide amorphous magnetic recording media with an amorphous magnetic structure whose magnetic domains are controlled to a fine structure capable of satisfying 60 Gb/inch$^2$.

Another object of the present invention is to provide a magnetic recording and reproduction apparatus using said amorphous magnetic recording medium.

DETAILED DESCRIPTION OF THE INVENTION

Taking an amorphous magnetic layer without any grain boundaries, the present inventors have made extensive studies on a method of controlling a magnetic domain structure under the direct influence of grains and grain boundaries in a magnetic domain formation-controlling layer composed of metal oxides upon the magnetic layer, and have accomplished the present invention.

The gists of the present invention capable of attaining the objects of the present invention are as follows: The present invention provides an amorphous magnetic recording medium, which comprises at least a substrate and a magnetic layer formed on the substrate directly or through at least one of other layers, where a magnetic domain formation-controlling layer is formed on the top side or the bottom side of the magnetic layer directly or through at least one of other layers, the magnetic domain formation-controlling layer comprises a main phase and 1 to 3 kinds of discrete spherical isolating phases horizontally arranged in lines in the main phase or 1 to 3 kinds of discrete spherical phases vertically stacked one upon another in the main phase, and the magnetic layer is amorphous.

The magnetic domain formation-controlling layer comprises a first oxide member selected from at least one of cobalt oxide, iron oxide and nickel oxide, and a second oxide member selected from at least one of silicon oxide, aluminum oxide, zinc oxide and titanium oxide.

Furthermore, in the present magnetic recording medium which comprises at least a substrate and a magnetic layer formed on the substrate directly or through at least one of other layers, it is preferable that the magnetic domain formation-controlling layer is formed on the bottom side of the magnetic layer directly or through at least one of other layers, the magnetic domain formation-controlling layer comprises 30 to 95% by weight of cobalt oxide, 30 to 2% by weight of silicon oxide and 40 to 3% by weight of titanium oxide, sum total being 100% by weight, and the magnetic layer is amorphous.

The present amorphous magnetic recording medium has an average surface roughness Ra of 0.03 to 0.4 nm, preferably 0.1 to 0.4 nm.

In the present amorphous magnetic recording medium, the magnetic domain formation-controlling layer is formed on the top side or the bottom side of the magnetic layer directly or through at least one of other layers and has a volume magnetic susceptibility of 50 to 200 (emu/cc) in an external magnetic field of 1 T (tesla), and the magnetic layer is amorphous.

In the magnetic domain formation-controlling layer, the isolating phases have an average grain size of 1 to 3 nm in case of a layer thickness of 1 to 3 nm, and 3 to 6 nm in case of a layer thickness of 3 to 15 nm, and a quotient obtained by dividing a standard deviation of grain sizes of the isolating phases by the average grain size is preferably not more than 25%.

The magnetic layer is composed of an amorphous alloy comprising a transition metal and a rare earth element.

To prevent oxidation of the amorphous magnetic layer, an intermediate layer is formed between the magnetic domain formation-controlling layer and the magnetic layer. The intermediate layer is a monolayer comprising any one of silicon, silicon nitride and aluminum nitride or a laminate thereof, in a layer thickness of preferably 0.5 to 5 nm.

Furthermore, the present invention provides a process for producing the magnetic recording medium, which comprises a step of forming a magnetic domain formation-controlling layer on a substrate and a step of forming a magnetic layer, where the former step includes formation of a main phase and 1 to 3 kinds of discrete spherical phases arranged horizontally in lines in the main phase in the magnetic domain formation-controlling layer, and the latter step includes formation of an amorphous magnetic layer as the magnetic layer. Preferably, the former step includes a mechanism of etching to form the magnetic domain formation-controlling layer.

Furthermore, the present invention provides a magnetic recording and reproduction apparatus, which comprises a magnetic recording medium, a spindle for supporting the medium, a spindle motor for rotating the spindle, a magnetic head for reading and writing information, a voice coil motor (VCM) for driving the magnetic head, and a circuit for controlling said members, where the magnetic recording medium comprises a substrate, a magnetic layer formed on the substrate directly or through at least one of other layers, where a magnetic domain formation-controlling layer is formed on the top side or the bottom side of the magnetic layer directly or through at least one of other layers, the magnetic domain formation-controlling layer comprising a main phase and 1 to 3 kinds of discrete spherical isolating phases arranged horizontally in lines in the main phase or 1 to 3 kinds of discrete spherical isolating phases vertically stacked in the main phase, and the magnetic layer is amorphous.

The magnetic head can be provided with a laser beam oscillator and an objective lens for converge the laser beam.

Preferable modes of the present invention are as follows:
(1) An amorphous magnetic recording medium, which comprises a substrate and a magnetic layer formed on the substrate directly or through at least one of other layers, where a magnetic domain formation-controlling layer is provided on the top side or the bottom side of the magnetic layer directly or through at least one of other layers, the magnetic domain formation-controlling layer comprising a main phase and 1 to 3 kind of discrete spherical isolating phases arranged horizontally in lines in the main phase or 1 to 3 kinds of discrete spherical isolating phases vertically stacked one upon another in the main phase and the magnetic layer is amorphous.
(2) An amorphous magnetic recording medium according to the aforementioned item (1), wherein the magnetic domain formation-controlling layer comprises a first oxide member selected from at least one of cobalt oxide, iron oxide and nickel oxide, and a second oxide member selected from at least one of silicon oxide, aluminum oxide, zinc oxide and titanium oxide.
(3) An amorphous magnetic recording medium according to the aforementioned item (1) or (2), wherein the magnetic recording medium has a surface average roughness Ra of 0.1 to 0.4 nm.
(4) An amorphous magnetic recording medium according to the aforementioned item (1) or (2), wherein the isolating phases of the magnetic domain formation-controlling layer have an average grain size of 1 to 3 nm in case of a layer thickness of 1 to 3 nm, and 3 to 6 nm in case of a layer thickness of 3 to 15 nm, and a quotient obtained by dividing a standard deviation of grain sizes of the isolating phases by the average grain size is not more than 25%.
(5) An amorphous magnetic recording medium according to the aforementioned item (1), wherein the magnetic domain formation-controlling layer has a volume magnetic susceptibility of 50 to 200 (emu/cc) in an external magnetic field of 1 T.
(6) An amorphous magnetic recording medium according to the aforementioned item (1), wherein the magnetic layer is composed of an amorphous alloy comprising a transition metal and a rare earth element.
(7) An amorphous magnetic recording medium according to any one of the aforementioned items (1) to (6), wherein an intermediate layer for preventing oxygen diffusion from the magnetic domain formation-controlling layer to the magnetic layer is formed between the magnetic domain formation-controlling layer and the amorphous magnetic layer of the magnetic recording medium.
(8) An amorphous magnetic recording medium according to the aforementioned item (7), wherein the intermediate layer is a monolayer comprising any one of silicon, silicon nitride and aluminum nitride or a laminate thereof.
(9) An amorphous magnetic recording medium, which comprises a substrate and a magnetic layer formed on the substrate directly or through at least one of other layers, where a magnetic domain formation-controlling layer is formed on the bottom side of the magnetic layer directly or through at least one of other layers, the magnetic domain formation-controlling layer comprises 30 to 95% by weight of cobalt oxide, 30 to 2% by weight of silicon nitride and 40 to 3% by weight of titanium oxide, sum total being 100% by weight, and the magnetic layer is amorphous.
(10) A process for producing an amorphous magnetic recording medium, which comprises a step of forming a magnetic domain formation-controlling layer on a substrate and a step of forming a magnetic layer, where the former step includes a step of forming a main phase and 1 to 3 kinds of discrete spherical isolating phases arranged horizontally in lines in the main phase or 1 to 3 kinds of discrete spherical isolating phases vertically stacked one upon another in the main phase and the latter step includes a step of forming an amorphous magnetic layer as the magnetic layer.

(11) A process according to the aforementioned item (10), wherein the magnetic domain formation-controlling layer is formed by etching.

(12) A process according to the aforementioned item (10) or (11), wherein the magnetic domain formation-controlling layer comprises a first oxide member selected from at least one of cobalt oxide, iron oxide and nickel oxide and a second oxide member selected from at least one of silicon oxide, aluminum oxide, zinc oxide and titanium oxide.

(13) A magnetic recording and reproduction apparatus, which comprises a magnetic recording medium, a spindle for supporting the medium, a spindle motor for rotating the spindle, a magnetic head for reading and writing information, a voice controller motor, VCM, for driving the magnetic head and a circuit for controlling said members, the magnetic recording medium comprising a substrate and a magnetic layer formed on the substrate directly or through at least one of other layers, where a magnetic domain formation-controlling layer is formed on the top side or the bottom side of the magnetic layer directly or through at least one of other layers, the magnetic domain formation-controlling layer comprising a main phase and 1 to 3 kinds of discrete-spherical isolating phases arranged horizontally in lines in the main phase or 1 to 3 kinds of discrete spherical isolating phases vertically stacked one upon another in the main phase, and the magnetic layer is amorphous.

(14) A magnetic recording and reproduction apparatus according to the aforementioned item (13), wherein the magnetic head is provided with a laser beam oscillator and an objective lens for conversing the laser beam.

(15) A magnetic recording and reproduction apparatus, which comprises a magnetic recording medium, a spindle for supporting the medium, a spindle motor for rotating the spindle, a magnetic head for reading and writing information, a voice controller motor, VCM, for driving the magnetic head and a circuit for controlling said members, where the magnetic recording medium comprises a substrate and a magnetic layer formed on the substrate directly or through at least one of other layers, a magnetic domain formation-controlling layer is formed on the top side or the bottom side of the magnetic layer directly or through at least one of other layers, the magnetic domain formation-controlling layer comprising a first oxide member selected from at least one of cobalt oxide, iron oxide and nickel oxide and a second oxide member selected from at least one of silicon oxide, aluminum oxide, zinc oxide and titanium oxide, and the magnetic layer is amorphous.

The present invention will be described in detail below, referring to Examples, which are not restrictive of the present invention.

EXAMPLE 1

Figure 1:
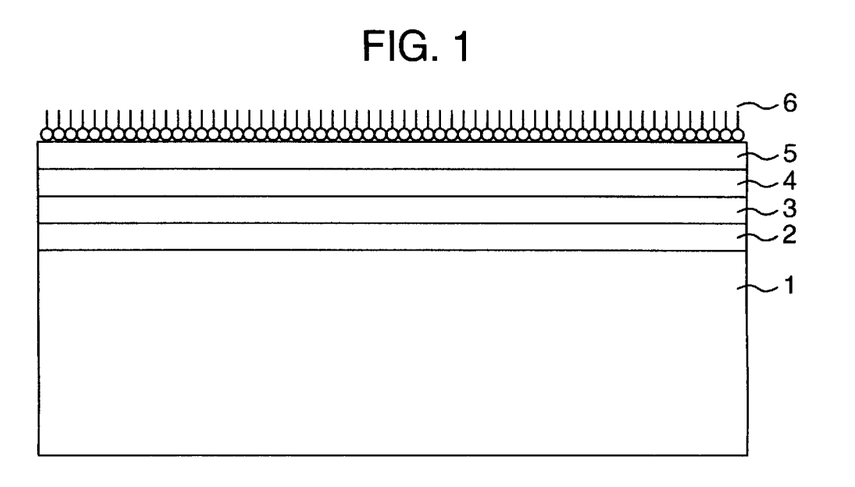
FIG. 1 is a schematic cross-sectional view of one type of a magnetic recording medium according to the present invention.

Cross-sectional structure of the thin film of a magnetic recording medium according to this Example is shown in FIG. 1, where numeral 1 designates a substrate, 2 a magnetic domain formation-controlling layer, 3 an oxidation-preventing layer, 4 an amorphous magnetic layer, 5 a protective layer and 6 a lubricating layer.

In this Example, a 2.5-inch glass substrate, 65 mm in outer diameter, was used as substrate 1. Substrate 1 was provided with a hole, 200 in inner diameter, at the center for chucking, and with a thickness of 0.635 mm. Layers from magnetic domain formation-controlling layer 1 to protective layer 5 were each deposited by sputtering, where all of the targets used had a diameter of 4 inches. Si was selected for oxidation-preventing layer 3 with a thickness of 2 nm and C was selected for protective layer 5 with a thickness of 5 nm.

A magnetic layer of 15Tb-75Fe-10Co in terms of % by mole with a thickness of 20 nm was used as amorphous magnetic layer 4, and the magnetic layer was formed by introducing an Ar gas into the chamber to make 0.26 Pa, generating a plasma, and conducting sputtering under-ah attainable vacuum degree of $7.0 \times 10^5$ Pa or less.

An oxide mixture of a transition metal oxide and a vitrification component was selected for the magnetic domain formation-controlling layer. In this Example, changes in properties of the magnetic layer were investigated by changing compositions and composition ratios of the magnetic domain formation-controlling layer.

For the composition, CoO, FeO, MnO and NiO were selected as transition metal oxide components and $SiO_2$, $TiO_2$, $Al_2O_3$ and ZnO were selected as vitrification components, and compositions, composition ratios, and thickness of the magnetic domain formation-controlling layer were changed.

Tables 1 to 3 show average grain sizes of isolating phases of the magnetic domain formation-controlling layer, quotients obtained by dividing a standard deviation by an average grain size, average grain boundary width, shapes of isolating phases as viewed cross-sectionally, and magnetic properties by changing ratios of the metal oxide component to the vitrification component, while fixing the metal oxide component to CoO and the vitrification components to ST [a mixture of S: ($SiO_2$) and T: ($TiO_2$) in a ratio of S to T=4:6 by weight].

TABLE 1

| Sample No. | Magnetic domain formation-controlling layer | | | | Average grain size of isolating phases (nm) | Average grain boundary width of isolating phases (nm) | Standard deviation of isolating phases (%) | Shapes of isolating phases | Coercive force (kOe) | Square ratio | Magnetic domain (nm) | R/W characteristics Reproduction output (dB) at 60 Gb/inch$^2$ signal |
|---|---|---|---|---|---|---|---|---|---|---|---|---|
| | Thickness (nm) | CoO | $SiO_2$ | $TiO_2$ | | | | | | | | |
| 1 | Without magnetic domain formation-controlling layer | | | | | | | | 1.6 | 0.6 | 160 | 10 |
| 2 | 0.5 | 97 | 1.2 | 1.8 | — | — | — | Homege- | 1.5 | 0.55 | 170 | 12 |

TABLE 1-continued

| Sample No. | Magnetic domain formation-controlling layer Thickness (nm) | CoO | SiO$_2$ | TiO$_2$ | Average grain size of isolating phases (nm) | Average grain boundary width of isolating phases (nm) | Standard deviation of isolating phases (%) | Shapes of isolating phases | Coercive force (kOe) | Square ratio | Magnetic domain (nm) | R/W characteristics Reproduction output (dB) at 60 Gb/inch$^2$ signal |
|---|---|---|---|---|---|---|---|---|---|---|---|---|
| 3 | | 95 | 2 | 3 | — | — | — | neous | 1.5 | 0.6 | 141 | 13 |
| 4 | | 85 | 6 | 9 | — | — | — | | 1.7 | 0.6 | 139 | 13 |
| 5 | | 80 | 8 | 12 | — | — | — | | 1.6 | 0.6 | 137 | 13 |
| 6 | | 50 | 20 | 30 | — | — | — | | 1.7 | 0.7 | 138 | 15 |
| 7 | | 40 | 24 | 36 | — | — | — | | 1.4 | 0.7 | 131 | 11 |
| 8 | | 20 | 32 | 48 | — | — | — | | 1.3 | 0.6 | 142 | 14 |
| 9 | 1 | 97 | 1.2 | 1.8 | 2.0 | 0.1 | 23.1 | Columnar | 1.4 | 0.58 | 178 | 14 |
| 10 | | 95 | 2 | 3 | 2.4 | 0.5 | 19.9 | Spherical | 2.4 | 0.8 | 10 | 43 |
| 11 | | 85 | 6 | 9 | 2.8 | 1.2 | 16.7 | | 2.7 | 0.9 | 38 | 45 |
| 12 | | 80 | 8 | 12 | 3.0 | 1.8 | 14.1 | | 2.8 | 0.89 | 33 | 45 |
| 13 | | 50 | 20 | 30 | 3.0 | 2.2 | 12.8 | | 2.6 | 0.8 | 36 | 42 |
| 14 | | 40 | 24 | 36 | 3.0 | 3.0 | 10.8 | | 2.6 | 0.9 | 44 | 43 |
| 15 | | 20 | 32 | 48 | — | — | — | Homogeneous | 1.7 | 0.64 | 139 | 15 |

TABLE 2

| Sample No. | Magnetic domain formation-controlling layer Thickness (nm) | CoO | SiO$_2$ | TiO$_2$ | Average grain size of isolating phases (nm) | Average grain boundary width of isolating phases (nm) | Standard deviation of isolating phases (%) | Shapes of isolating phases | Coercive force (kOe) | Square ratio | Magnetic domain (nm) | R/W characteristics Reproduction output (dB) at 60 Gb/inch$^2$ signal |
|---|---|---|---|---|---|---|---|---|---|---|---|---|
| 16 | 3 | 97 | 1.2 | 1.8 | 2.5 | 0.5 | 33.0 | Columnar | 1.5 | 0.55 | 141 | 16 |
| 17 | | 95 | 2 | 3 | 3.0 | 0.7 | 25.0 | | 2.8 | 0.89 | 41 | 42 |
| 18 | | 85 | 6 | 9 | 3.5 | 0.9 | 19.4 | Spherical | 2.6 | 0.88 | 37 | 46 |
| 19 | | 80 | 8 | 12 | 4.0 | 1.7 | 17.2 | | 2.7 | 0.88 | 36 | 46 |
| 20 | | 50 | 20 | 30 | 4.0 | 2.6 | 15.3 | | 2.7 | 0.86 | 38 | 41 |
| 21 | | 40 | 24 | 36 | 3.0 | 3.4 | 13.8 | Lamellar | 2.9 | 0.87 | 42 | 43 |
| 22 | | 20 | 32 | 48 | 2.0 | 4.1 | 11.2 | | 1.5 | 0.2 | 171 | 15 |
| 23 | 5 | 97 | 1.2 | 1.8 | 4.0 | 0.5 | 31.6 | Columnar | 1.2 | 0.55 | 135 | 14 |
| 24 | | 95 | 2 | 3 | 4.0 | 0.8 | 27.0 | | 1.3 | 0.62 | 141 | 12 |
| 25 | | 85 | 6 | 9 | 4.0 | 1.1 | 23.9 | Spherical | 2.5 | 0.8 | 34 | 45 |
| 26 | | 80 | 8 | 12 | 4.0 | 1.3 | 13.7 | | 2.9 | 0.88 | 34 | 48 |
| 27 | | 50 | 20 | 30 | 4.0 | 2.4 | 12.8 | | 2.7 | 0.88 | 45 | 43 |
| 28 | | 40 | 24 | 36 | 3.0 | 3.1 | 11.7 | Lamellar | 0.4 | 0.4 | 141 | 13 |
| 29 | | 20 | 32 | 48 | 2.5 | 3.6 | 10.8 | | 0.2 | 0.3 | 152 | 11 |

TABLE 3

| Sample No. | Magnetic domain formation-controlling layer Thickness (nm) | CoO | SiO$_2$ | TiO$_2$ | Average grain size of isolating phases (nm) | Average grain boundary width of isolating phases (nm) | Standard deviation of isolating phases (%) | Shapes of isolating phases | Coercive force (kOe) | Square ratio | Magnetic domain (nm) | R/W characteristics Reproduction output (dB) at 60 Gb/inch$^2$ signal |
|---|---|---|---|---|---|---|---|---|---|---|---|---|
| 30 | 15 | 97 | 1.2 | 1.8 | 14.1 | 0.4 | 32.1 | Columnar | 1.4 | 0.56 | 143 | 14 |
| 31 | | 95 | 2 | 3 | 11.7 | 0.6 | 30.0 | | 1.6 | 0.63 | 146 | 11 |
| 32 | | 85 | 6 | 9 | 6.0 | 1.0 | 25.0 | Spherical | 2.5 | 0.85 | 41 | 43 |
| 33 | | 80 | 8 | 12 | 4.7 | 1.2 | 19.8 | | 2.8 | 0.88 | 35 | 43 |
| 34 | | 50 | 20 | 30 | 3.4 | 1.7 | 15.1 | | 2.5 | 0.85 | 44 | 42 |
| 35 | | 40 | 24 | 36 | 2.3 | 2.4 | 13.4 | Lamellar | 1.2 | 0.52 | 161 | 12 |
| 36 | | 20 | 32 | 48 | 2.8 | 3.2 | 11.9 | | 1.5 | 0.61 | 145 | 11 |
| 37 | 20 | 97 | 1.2 | 1.8 | 14.1 | 0.3 | 34.5 | Columnar | 1.1 | 0.62 | 148 | 13 |
| 38 | | 95 | 2 | 3 | 12.5 | 0.5 | 32.1 | | 1.2 | 0.63 | 145 | 14 |
| 39 | | 85 | 6 | 9 | 6.7 | 0.9 | 25.6 | | 1.4 | 0.6 | 141 | 12 |
| 40 | | 80 | 8 | 12 | 5.7 | 1.1 | 25.1 | | 1.4 | 0.61 | 141 | 16 |
| 41 | | 50 | 20 | 30 | 4.1 | 1.5 | 17.3 | Lamellar | 1.2 | 0.65 | 145 | 14 |
| 42 | | 40 | 24 | 36 | 3.1 | 1.9 | 15.4 | | 1.3 | 0.6 | 141 | 12 |
| 43 | | 20 | 32 | 48 | 2.9 | 2.7 | 14.9 | | 1.1 | 0.61 | 141 | 15 |

Individual evaluations were conducted as follows:

In every cases of plane TEM image observation of magnetic domain formation-controlling layers, structures of spot-wise presence of spherical or lamellar isolating phases in the main phase were observed. Areas each of the isolating phases was calculated from the resulting TEM images. Presuming respective circles to have the calculated areas, diameters of presumed circles were assumed to be grain sizes.

Grain sizes of about 100 to about 300 isolating phases per sample were analyzed to calculated an average grain size and a standard deviation. For an average grain boundary width, arbitrary 100 grain boundary width were selected to obtain an average of the widths by calculation.

Exact shapes of isolating phases could not be determined only from plane TEM images. Thus, cross-section TEM images were obtained and observed to judge exact shapes of grains from both plane TEM images and cross-section TEM images.

Magnetic properties were determined by a vibration fluxmeter (VSM) and the magnetic domain size was determined by a magnetic force microscope (MFM). Determination each of the foregoing properties was carried out without applying a lubricating film to the magnetic recording media.

Figure 2:
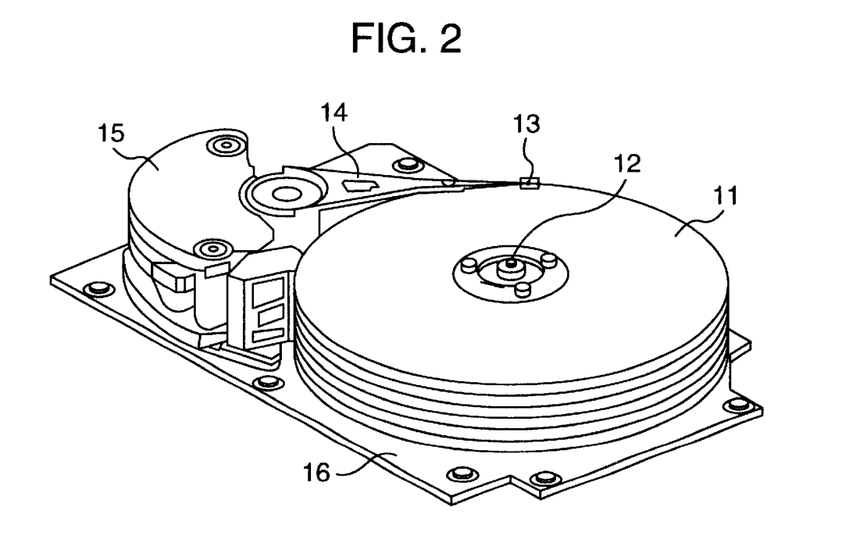
FIG. 2 is a perspective view of a magnetic recording and reproduction apparatus according to the present invention.

R/W characteristics were determined with a magnetic recording and reproduction apparatus as shown in FIG. 2, after, application of a lubricating film to magnetic recording media, where numeral 11 is a magnetic disc, 12 a spindle, 13 a magnetic head, 14 a magnetic head arm, 15 a voice coil motor (VCM) and 16 a box. For recording, a magnetic head with a soft magnetic film having a high saturation flux density of 3.1 T was used, whereas for reproduction, a head with a maximal magnetoresistivity was used. Distance between the magnetic head surface and the magnetic layer surface was set to 10 nm.

In columns "average grain size", "average grain boundary width" and "standard deviation" in Table 1, blanks mean that no determination could be made because no discrete boundaries were obtained between the isolating phases and the main phase in the plane TEM images. Sample No. 1 shows results of a sample without vapor deposition of any magnetic domain formation-controlling layer (Comparative Example). Sample No. 1 had a coercive force of 1.6 koe, a square ratio of 0.6 and a magnetic domain size of 160 nm.

Samples Nos. 2 to 8 with a 0.5 mm-thick magnetic domain formation-controlling layer had a coercive force of 1.4 to 1.8 kOe, a square ratio of 0.5 to 0.7, a magnetic domain size of 140 to 170 nm and an R/W characteristic of about 10 dB, all of which were not so much improved as compared with Comparative Example.

In cases of 1 nm and 3 nm-thick magnetic domain formation-controlling layers, Samples Nos. 10 to 14 and Nos. 17 to 21 having 95 to 40% by weight of metal oxide component, an average grain size of 1 to 3 nm and an average grain boundary width of 0.7 to 4.0 nm had a coercive force of 2.4 to 2.8, a square ratio of 0.85 to 0.9, a magnetic domain size of 35 to 45 nm and a R/W characteristics of 40 to 45 dB, all of which were much improved as compared with Comparative Example.

In cases of 5 nm and 15 nm-thick magnetic domain formation-controlling layers, Samples Nos. 25 to 27 and Nos. 32 to 34 having 50 to 85% by weight of metal oxide component, an average grain size of 3 to 6 nm and an average grain boundary width of 1.1 to 2.2 nm, which were different from the conditions of the 1 nm and 3 nm-thick magnetic domain formation-controlling layers, had a coercive force of 2.4 to 2.8, a square ratio of 0.85 to 0.9, a magnetic domain size of 35 to 45 nm and a R/W characteristic of 40 to 45 dB, all of which were much improved as compared with Comparative Example.

Samples No. 37 to 43 with a 20 nm-thick magnetic domain formation-controlling layer had a coercive force of 1.4 to 1.8 kOe, a square ratio of 0.5 to 0.7, a magnetic domain size of 140 to 170 nm and an R/W characteristic of about 10 dB, all of which were not improved, as compared with Comparative Example. Standard deviation of 25% or less was found preferable for all of the 1, 3, 5, 15 and 20 nm-thick magnetic domain formation-controlling layers.

Figure 3:
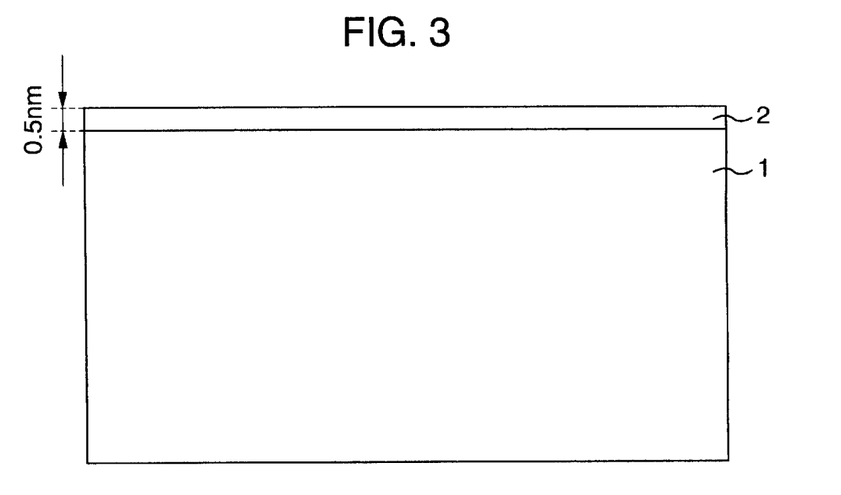
FIG. 3 is a schematic cross-sectional view of a magnetic recording medium according to one example of the present invention, as observed by cross-section TEM.

These results will be observed below from the shapes of isolating phases. Schematic cross-sectional view of the 0.5 nm-thick magnetic domain formation-controlling layer of Sample No. 5 showing a homogeneous structure is given in FIG. 3, where grain boundaries between isolating phases are not discrete.

Figure 4:
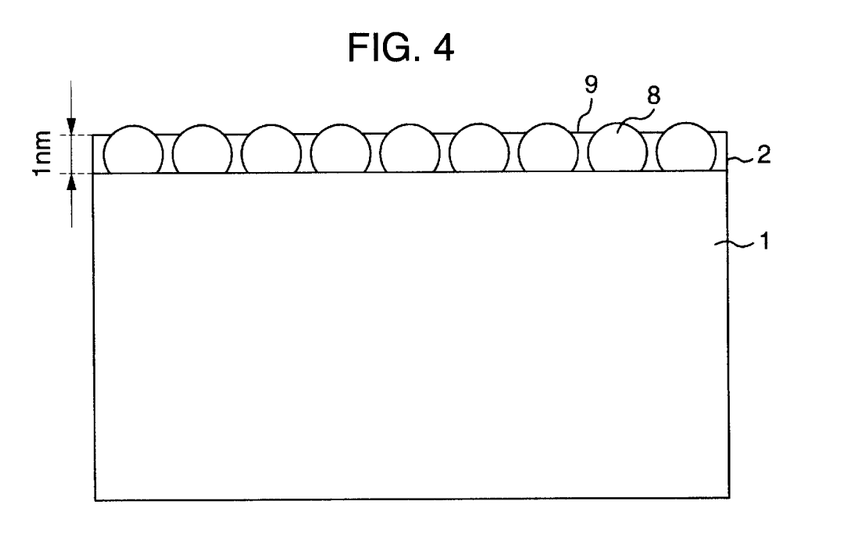
FIG. 4 is a schematic cross-sectional view of another magnetic recording medium according to another example of the present invention, as observed by cross-section TEM.
Figure 5:
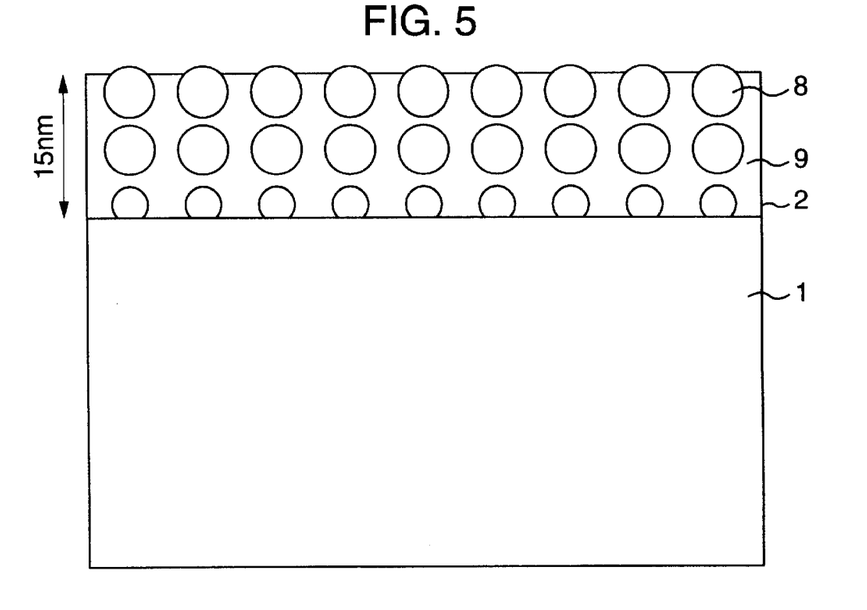
FIG. 5 is a schematic cross-sectional view of other magnetic recording medium according to other example of the present invention, as observed by cross-section TEM.

Schematic cross-sectional view of the 1 nm-thick magnetic domain formation-controlling layer of Sample No. 12 showing a discrete spherical isolating phase structure is given in FIG. 4 and that of 15 nm-thick magnetic domain formation-controlling layer of Sample No. 33 showing a discrete spherical isolating phase structure is given in FIG. 5.

The discrete spherical isolating phase structure includes a structure of discrete spherical isolating phases 8 arranged horizontally in lines in main phase 9 (FIG. 4) and a structure of discrete spherical isolating phases 8 vertically stacked one upon another in main phase 9 (FIG. 5).

Figure 6:
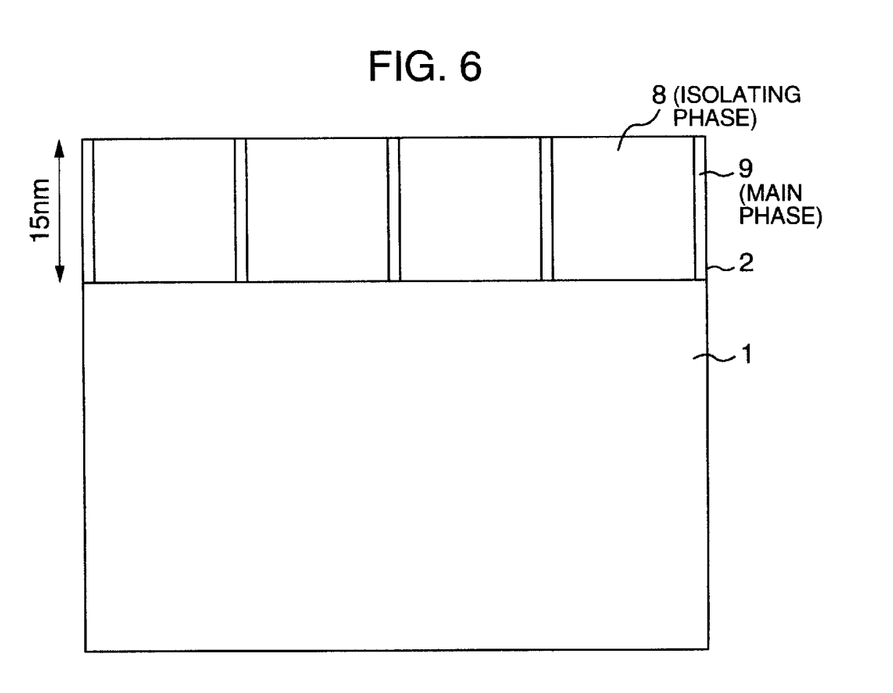
FIG. 6 is a schematic cross-sectional view of a further magnetic recording medium according to a further example of the present invention, as observed by cross-section TEM.

Schematic cross-sectional view of the 15 nm-thick magnetic domain formation-controlling layer of Sample No. 31 showing a columnar isolating phase structure is shown in FIG. 6, where columnar isolating phases 8 are grown on the substrate surface into main phase 9.

Figure 7:
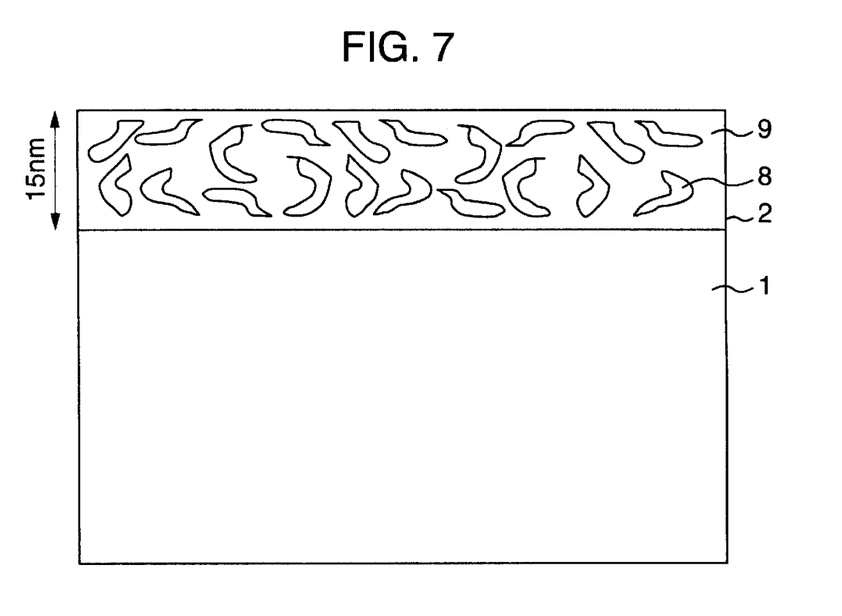
FIG. 7 is a schematic cross-sectional view of a still further magnetic recording medium according to a still further example of the present invention, as observed by cross-section TEM.

Schematic cross-sectional view of the 20 nm-thick magnetic domain formation-controlling layer of Sample No. 41 showing a lamellar isolating phase structure is given in FIG. 7, where lamellar isolating phases 8 are grown in random directions in main phase 9. All of these isolating phases and the main phase were found not crystalline, but amorphous.

In FIGS. 3 to 7, numeral 1 designates a substrate, 2 a magnetic domain formation-controlling layer, 8 isolating layers and 9 main phase constituting boundaries between isolating phases 8.

Comparison of shapes of isolating phases 8 as to the magnetic properties revealed that all the samples showing improved magnetic properties were in a structure of discrete spherical isolating phases 8 arranged horizontally in lines or a structure of isolating phases 8 vertically stacked one upon another, whereas all the samples showing no improved magnetic properties were in a structure of not discrete spherical isolating phases, but of homogeneous, columnar or lamellar isolating phases.

It can be seen from the foregoing results that the structure of discrete spherical isolating phases arranged horizontally in lines in the main phase or discrete spherical isolating phases vertically stacked one upon another in the main phase were preferable for the magnetic domain formation-controlling layer. Furthermore, it was found that when the thickness of the magnetic domain formation-controlling layer was 1 to 3 nm, the amorphous magnetic recording media showed good magnetic properties at least at 40–95% by weight of metal oxide component, an average grain size of 1 to 3 nm and an average grain boundary width of 0.7 to 4 nm, and also when the thickness was 3 to 15 nm, the magnetic recording media showed good magnetic properties at least at 50 to 85% by weight of metal oxide component, an average grain size of 3 to 6 nm and an average grain boundary width of 0.7 to 3.4 nm.

Table 4 shows test results when the kind of metal oxide component or the kind of vitrification component was changed. In the tests, a ratio of the metal oxide component: the vitrification component by weight was fixed to 8:2 corresponding to that of Sample No. 33 having improved magnetic properties shown in Table 3, and the metal oxide CoO was changed to FeO, MnO or NiO, or the vitrification component $TiO_2$ was changed to $Al_2O_3$ or ZnO, where Samples Nos. 44 to 46 correspond to those with changed metal oxide components and Samples Nos. 47 and 48 correspond to those with changed vitrification components.

one upon another is essential for the magnetic domain formation-controlling layer.

Furthermore, it was found that, when the thickness of the magnetic domain formation-controlling layer was 1 to 3 nm, good properties were obtained at 40 to 95% by weight of the metal oxide component and an average grain size of 1 to 3 nm, and that when the thickness was 3 to 15 nm, good properties were obtained at 50 to 85% by weight of the metal oxide and an average grain size of 3 to 6 nm. It was also found that CoO, FeO, MnO and NiO were suitable for the transition metal oxide component and $SO_2$, $TiO_2$, $Al_2O_3$ and ZnO were suitable for the vitrification component.

EXAMPLE 2

In this Example, changes in properties of amorphous magnetic layer were investigated by taking the magnetic

TABLE 4

| Sample No. | Thickness (nm) | Composition of magnetic domain formation-controlling layer (wt. %), etc. | | | | | | | | Average grain size of isolating phases (nm) |
|---|---|---|---|---|---|---|---|---|---|---|
| | | Metal oxide | | | | Vitrification component | | | | |
| | | CoO | FeO | MnO | NiO | $SiO_2$ | $TiO_2$ | $Al_2O_3$ | ZnO | |
| 1 | Failure to vapor deposite magnetic domain formation-control layer | | | | | | | | | |
| 33 | 80 | — | — | — | — | 8 | 12 | — | — | 4.7 |
| 44 | — | 80 | 80 | — | — | 8 | 12 | — | — | 4.8 |
| 45 | — | — | — | 80 | — | 8 | 12 | — | — | 4.9 |
| 46 | — | — | — | — | 80 | 8 | 12 | — | — | 4.6 |
| 47 | 80 | — | — | — | — | 8 | — | 12 | — | 4.5 |
| 48 | 80 | — | — | — | — | 8 | — | — | 12 | 4.6 |

| Grain boundary width of isolating phase (nm) | Standard deviation of isolating phase (%) | Shapes of isolating phases | Coercive force (kOe) | Square ratio | Magnetic domain (nm) | R/W characteristics Reproduction output at 60 Gb/inch² signal |
|---|---|---|---|---|---|---|
| Failure to vapor deposite magnetic domain formation-controlling layer | | | 1.6 | 0.6 | 160 | 10 |
| 2 | 15.8 | Spherical | 2.8 | 0.88 | 35 | 43 |
| 1.8 | 15.6 | | 2.82 | 0.89 | 34 | 45 |
| 1.7 | 15.3 | | 2.83 | 0.9 | 33 | 47 |
| 2.2 | 15.9 | | 2.78 | 0.87 | 38 | 41 |
| 2.6 | 16.8 | | 2.84 | 0.88 | 39 | 43 |
| 2.5 | 17.1 | | 2.88 | 0.85 | 40 | 44 |

Observation of samples with changed metal oxide components revealed that the average grain sizes were reduced in the order of MnO, FeO, CoO and NiO, but other properties were not substantially changed, showing good results.

Observation of samples with changed vitrification components revealed that the average grain sizes increased in the order of $TiO_2$, $Al_2O_3$ and ZnO, but the properties of all the samples were satisfactory as in the tests of changing the metal oxide components.

The foregoing test results are summarized as follows:

Structure of discrete isolating phases 8 arranged horizontally in lines or discrete spherical phases 8 vertically stacked properties of the magnetic domain formation-controlling layer into consideration. Tests were carried out by using $Co_3O_4$ of spinel structure as the transition metal oxide of the magnetic domain formation-controlling layer and replacing Co with Fe to change the magnetic properties.

Table 5 shows changes in average grain sizes of isolating phases of the magnetic domain formation-controlling layer, volume magnetic susceptibility of the magnetic domain formation-controlling layer in an external magnetic field of 1 T and magnetic properties of amorphous magnetic layer, magnetic domain size and R/W characteristics against change in x of $80(Co_{3-x}, Fe_x, O_4)$–20ST.

TABLE 5

| Sample No. | Sample composition $80(Co_{3-x}Fe_xO_4)$ –20ST ($SiO_2$—$TiO_2$) | Average grain size of isolating phases (nm) | Volume magnetic susceptibility of magnetic domain formation-controlling layer in an external magnetic field of 1 T (emu/cc) | Coercive force (kOe) | Square ratio | Magnetic domain (nm) | R/W characteristics Reproduction output (dB) at 60 Gb/inch² signal |
|---|---|---|---|---|---|---|---|
| 1 | Not vapor-deposited | — | — | 1.6 | 0.6 | 160 | 10 |
| 33 | 80CoO–20ST | 4.7 | 35 | 2.8 | 0.88 | 35 | 43 |
| 101 | 0 | 4.7 | 40 | 2.82 | 0.84 | 37 | 44 |

TABLE 5-continued

| Sample No. | Sample composition 80(Co$_{3-x}$Fe$_x$O$_4$)-20ST (SiO$_2$—TiO$_2$) | Average grain size of isolating phases (nm) | Volume magnetic susceptibility of magnetic domain formation-controlling layer in an external magnetic field of 1 T (emu/cc) | Coercive force (kOe) | Square ratio | Magnetic domain (nm) | R/W characteristics Reproduction output (dB) at 60 Gb/inch$^2$ signal |
|---|---|---|---|---|---|---|---|
| 102 | 0.2 | 4.8 | 50 | 3.05 | 0.9 | 31 | 51 |
| 103 | 0.4 | 4.9 | 96 | 3.1 | 0.89 | 30 | 53 |
| 104 | 0.6 | 4.6 | 159 | 3.02 | 0.9 | 28 | 54 |
| 105 | 0.8 | 4.7 | 200 | 2.99 | 0.9 | 29 | 57 |
| 106 | 1 | 4.7 | 290 | — | — | — | — |
| 107 | 1.2 | 4.5 | 370 | — | — | — | — |
| 108 | 2 | 4.6 | 500 | — | — | — | — |
| 109 | 3 | 4.7 | 514 | — | — | — | — |

Comparison of Sample No. 33 with Sample No. 101 revealed that no substantial changes were observed in properties between CoO and Co$_3$O$_{41}$, both showing good properties. Even replacement of Fe in Co$_3$O$_4$ gave no substantial change to the properties, but some changes to the magnitudes of coercive force, square ratio and magnetic domain. Samples Nos. 102 to 105 with x=0.2 to 0.8 had an increase in the coercive force of amorphous magnetic layer and a good R/W characteristics as well.

However, in case of Samples with x=1.0 or more, the volume magnetic susceptibility of the magnetic domain formation-controlling layer in an external magnetic field of 1 T exceeded 200 (emu/cc), showing the magnetic property of two-step loop, that is, an unpreferable R/W characteristic was obtained.

From the foregoing test results it can be seen that so long as the volume magnetic susceptibility of the magnetic domain formation-controlling layer in an external magnetic field of 1 T is in a range of 50 to 200 (emu/cc), good properties can be obtained, but at more than 200 (emu/cc) a two-step loop is formed, deteriorating the properties.

EXAMPLE 3

In this Example, changes in properties of amorphous magnetic layer were investigated by changing the surface roughness of the magnetic domain formation-controlling layer, where after the deposition of the magnetic domain formation-controlling layer the surface roughness of the magnetic domain formation-controlling layer was changed by reverse sputtering. That is, the magnetic domain formation-controlling layer corresponding to the conditions of Sample No. 33 in Table 3 was subjected to reverse sputtering under reverse sputtering conditions of power: 100W and argon gas pressure: 3 Pa, and the surface roughness was changed by changing the reverse sputtering time.

Table 6 shows test results of changes in the average surface roughness Ra with changing reversing sputtering time, changes in the magnetic properties of the amorphous magnetic layer, distance between between the magnetic head and the magnetic layer and R/W characteristics. Surface roughness was evaluated by observing the surfaces of magnetic recording media by AFM and observing the surface form of the individual layers by cross-section TEM images.

TABLE 6

| Sample No. | Reverse sputtering time (sec) | Ra of magnetic recording medium (nm) | Coercive force (kOe) | Square ratio | Magnetic domain (nm) | Distance between magnetic head and magnetic layer (nm) | R/W characteristics Reproduction output (dB) at 60 Gb/inch$^2$ signal | Remarks |
|---|---|---|---|---|---|---|---|---|
| 1 | — | — | 1.6 | 0.6 | 160 | 10 | 10 | Comp. Ex. |
| 33 | 0 | 0.08 | 2.8 | 0.88 | 35 | 10 | 43 | |
| 201 | 5 | 0.1 | 3.1 | 0.91 | 34 | 10 | 51 | |
| 202 | 30 | 0.24 | 3.01 | 0.92 | 33 | 10 | 52 | |
| 203 | 60 | 0.34 | 3.04 | 0.93 | 32 | 10 | 50 | |
| 204 | 90 | 0.40 | 3.07 | 0.91 | 31 | 10 | 51 | |
| 205 | 120 | 0.65 | 3.09 | 0.9 | 29 | 20 | 24 | |
| 206 | 150 | 0.78 | 3.05 | 0.92 | 30 | 20 | 23 | |
| 207 | 180 | 0.89 | 3.04 | 0.91 | 31 | 20 | 25 | |
| 208 | 210 | 1.00 | 3.08 | 0.84 | 33 | 20 | 26 | |

Ra was increased with increasing reverse sputtering time. No surface roughness of the substrate was observed in cross-section TEM images. In the surface form of magnetic domain formation-controlling layer 2, convex shapes were formed at positions of isolating phases 8 and concave shapes at the position of main phase 9 in the magnetic domain formation-controlling layer, and surface roughness was observed on such overlayers as oxidation-preventing layer 3, amorphous magnetic layer 4 and protective layer 5, under the influence of the surface roughness of the magnetic domain formation controlling layer. The surface roughness of the overlayers was found much pronounced by the reverse sputtering of the magnetic domain formation-controlling layer.

In view of the results of cross-section TEM images, increase in Ra observed by AFM seems to correspond to changes in Ra of magnetic domain formation-controlling layer 2. Samples Nos. 201 to 208 with increased Ra of 0.1 nm or more by reverse sputtering had improved magnetic properties and R/W characteristic. However, Sample No. 209 subjected to reverse sputtering for 120 seconds had Ra of 0.15 nm, i.e. very high surface roughness, so that the levitation height of a magnetic head was increased to 20 nm to increase the distance between the magnetic head and the magnetic layer, deteriorating the R/W characteristic.

It is clear from the foregoing results that the reverse sputtering can improve the R/W characteristic, but higher Ra than 0.4 nm will rather deteriorate the R/W characteristic.

EXAMPLE 4

Figure 8:
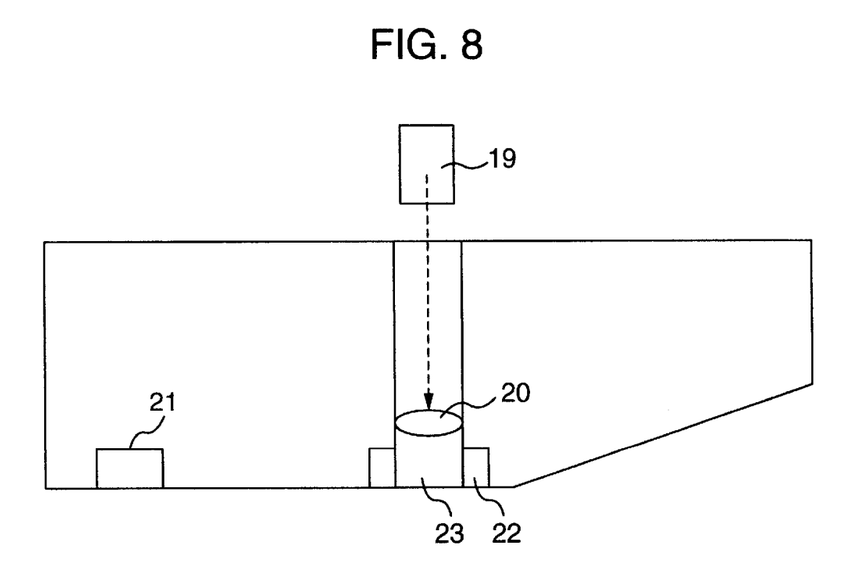
FIG. 8 is a schematic cross-sectional view of a magnetic head used in the present invention.

In this Example, R/W characteristic of magnetic recording medium was evaluated by providing an optical circuit on a magnetic head and irradiating. The medium with a laser beam. State of the magnetic head for evaluation is shown in FIG. 8, where numeral 19 is a laser beam source to be provided, 20 an objective-lens for converging the laser beam, 21 a reproduction head, 22 a magnetic coil and 23 a magnetic head core.

Laser beam was irradiated onto the magnetic layer in the vertical direction to the magnetic layer at a power of 5 mW, using a semiconductor laser with an oscillation wavelength of 640 nm. NA (numerical aperture) of the objective lens used in this Example was 0.85. Evaluation of R/W characteristic was carried out by recording by recording head 23, while heating the magnetic layer through laser beam irradiation according to signals and reproducing recorded signals by reproduction head 21.

In this Example, conditions for forming the magnetic domain formation-controlling layer corresponding to Sample No. 33 in Table 3 were also used. As a result, it was found that a reproduction output 60d was obtained at a 60 Gb/inch$^2$ signal under the influence of an improved resistance to thermal drift by laser irradiation.

From the foregoing results it can be seen that a higher reproduction output could be obtained by providing the recording head with a laser beam oscillator.

EXAMPLE 5

In this Example, tests were carried out by changing the thickness and composition of the oxidation-preventing layer. Table 7 shows results of using-the same magnetic domain formation-controlling layer as formed under conditions of Sample No. 33 as shown in Table 3.

In Table 7, Samples Nos. 33 to 306 are examples using Si as an oxidation-preventing layer, Samples Nos. 307 to 310 are examples using $Si_3N_4$, and Samples Nos. 311 to 314 are examples using AlN.

When the thickness of the oxidation-preventing layer was less than 0.5 nm, no substantial coercive force was observed, whereas in an thickness of 0.5 to 5 nm the coercive force was improved, but in a thickness of 7 nm the coercive force was on a level substantially equal to that of Comparative Example.

When the thickness of the oxidation-preventing layer was less than 0.5 nm, no metallic luster was observed on the amorphous magnetic recording media of laminate film, which was substantially transparent. Thus, it seems that the amorphous magnetic layer was oxidized under the influence of oxygen diffusion from the magnetic domain formation-controlling layer, resulting in reduction of the coercive force, whereas it seems that the oxidation-preventing layer having a thickness of 7 nm was under a less influence of the magnetic domain formation-controlling layer upon the characteristics of the amorphous magnetic layer.

It can be seen from the foregoing test results that the optimum thickness of the oxidation-preventing layer is 0.5 to 5 nm. In this Example, test results of Si, silicon nitride and aluminum nitride are shown, but any amorphous film can be used as an oxidation-preventing layer, so long as it can prevent oxygen diffusion from the substrate, the magnetic domain formation-controlling layer or even from air and also it has a good adhesion to other layers in contact.

EXAMPLE 6

In this Example, test results of observing 2 or 3 kinds of discrete isolating phases in the main phase of the magnetic domain formation-controlling layer are shown. A 80Co-8Si-12Ti (wt. %) target was selected as a forget of the magnetic domain formation-controlling layer and magnetic domain formation-controlling layers were formed by reactive sputtering, using a gas mixture of argon gas and oxygen gas, where the oxygen gas concentration was changed to 0 to 10% on the basis of total gas pressure of 0.26 Pa. Results of wide-angle X-ray diffraction, average grain size of discrete isolating phases, magnetic properties, magnetic domain size and results of R/W characteristic are shown in Table 8.

TABLE 7

| Sample No. | Oxidation-preventing layer Composition | Thickness (nm) | Coercive force (kOe) | Square ratio | Magnetic domain size (nm) | R/W characteristics Reproduction output (dB) at 60 Gb/inch$^2$ signal |
|---|---|---|---|---|---|---|
| 1 | Without deposition of magnetic domain formation-controlling layer | | 1.6 | 0.6 | 160 | 10 |
| 33 | Si | 2 | 2.8 | 0.88 | 35 | 43 |
| 301 | | 0 | 0.1 | 0.2 | — | — |
| 302 | | 0.1 | 0.1 | 0.2 | — | — |
| 303 | | 0.5 | 2.9 | 0.82 | 44 | 47 |
| 304 | | 1 | 2.86 | 0.83 | 43 | 41 |
| 305 | | 5 | 2.88 | 0.81 | 43 | 42 |
| 306 | | 7 | 1.61 | 0.63 | 156 | 10 |
| 307 | AlN | 0.1 | 0.2 | 0.2 | — | — |
| 308 | | 0.5 | 2.91 | 0.85 | 38 | 43 |
| 309 | | 5 | 2.85 | 0.9 | 35 | 44 |
| 310 | | 7 | 1.77 | 0.6 | 171 | 11 |
| 311 | SiN | 0.1 | 0.3 | 0.23 | — | — |
| 312 | | 0.5 | 2.9 | 0.9 | 34 | 42 |
| 313 | | 5 | 2.88 | 0.9 | 35 | 43 |
| 314 | | 7 | 1.58 | 0.61 | 170 | 12 |

TABLE 8

| Sample No. | Oxygen concentration at sputtering (%) | Kind of isolating phases observed by wide-angle X-ray diffraction | Volume magnetic susceptibility of magnetic domain formation-controlling layer in an external magnetic field of 1 T (emu/cc) | Coercive force (kOe) | Square ratio | Magnetic domain size (nm) | R/W characteristics Reproduction output (dB) at 60 Gb/inch$^2$ signal |
|---|---|---|---|---|---|---|---|
| 1 | — | Without deposition of magnetic domain formation-controlling layer | — | 1.6 | 0.6 | 180 | 10 |
| 401 | 0 | Co | 738 | — | — | — | — |
| 402 | 2 | Co | 697 | — | — | — | — |
| 403 | 4 | Co$_3$CoO | 361 | — | — | — | — |
| 404 | 6 | Co$_3$CoO | 321 | — | — | — | — |
| 405 | 8 | Co$_3$CoO,Co$_3$O$_4$ | 141 | 2.89 | 0.86 | 38 | 47 |
| 406 | 10 | Co$_3$CoO,Co$_3$O$_4$ | 140 | 2.86 | 0.9 | 37 | 48 |
| 407 | 16 | CoO, Co$_3$O$_4$ | 21 | 2.85 | 0.88 | 35 | 49 |
| 408 | 20 | CoO,Co$_3$O$_4$ | 23 | 2.86 | 0.9 | 37 | 48 |
| 409 | 25 | Co$_3$O$_4$ | 51 | 2.84 | 0.88 | 35 | 49 |
| 410 | 30 | Co$_3$O$_4$ | 52 | 2.83 | 0.89 | 36 | 50 |

As shown in Table 8, X-ray diffraction of magnetic domain formation-controlling layers revealed that Samples Nos. 401 and 402 formed at 2% or less oxygen gas concentrations had a Co peak, Samples Nos. 403 and 404 formed at 4 to 6% oxygen gas concentrations had a Co peak and a CoO peak, Samples Nos. 405 and 406 formed at 8 to 10% oxygen gas concentrations had a Co peak, a CoO peak and a Co$_3$O$_4$ peak, Samples Nos. 407 and 408 formed at 16 to 20% oxygen gas concentrations had a CoO peak and a Co$_3$O$_4$ peak and Samples Nos. 409 and 410 formed at 25% or more oxygen gas concentration had a Co$_3$O$_4$ peak.

Observation of cross-section TEM images of the magnetic domain formation-controlling layers revealed that Samples Nos. 403, 404, 407 and 408 had two kinds of discrete isolating phases (Co and CoO, or CoO and Co$_3$O$_4$) and Samples Nos. 405 and 406 had 3 kinds of discrete isolating phases (Co, CoO and Co$_3$O$_4$), as corresponded to the results of X-ray diffraction.

In case of Samples Nos. 401 and 402 having single discrete Co isolating phases and Samples Nos. 403 and 404 having two kinds of discrete isolating Co phases and discrete isolating CoO phases, the volume magnetic susceptibility exceeded 200 (emu/cc) and no better magnetic properties were obtained, but in other samples, magnetic properties were not substantially changes, and were found better.

It can be seen from these test results that better magnetic properties could be obtained, even if the number of kinds of discrete isolating phases was changed to 1, 2 or 3.

EXAMPLE 7

Figure 9:
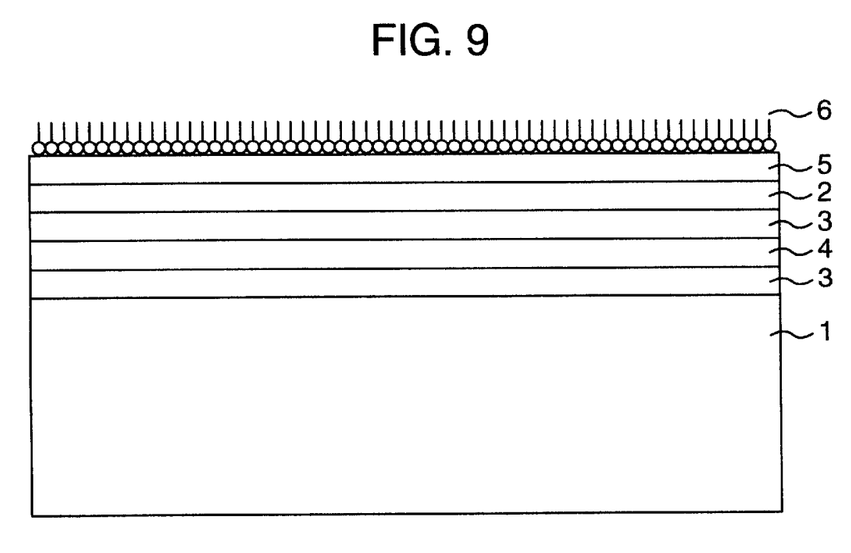
FIG. 9 is a schematic cross-sectional view of another type of a magnetic recording medium according to the present invention.

In this Example, magnetic properties and changes in R/W characteristic when a magnetic domain formation-controlling layer was deposited on the top side of the amorphous magnetic layer were investigated. FIG. 9 shows a schematic cross-sectional view of a magnetic recording medium according to this Example, where numeral 1 designates a substrate, 3 oxidation-preventing layers, 4 an amorphous magnetic layer, 2 a magnetic domain formation-controlling layer, 5 a protective layer and 6 a lubricating layer.

Table 9 shows results of magnetic properties of a magnetic recording medium without deposition of a magnetic domain formation-controlling layer, that with deposition of the magnetic domain formation-controlling layer at the bottom side of the amorphous magnetic layer, and that with deposition of the magnetic domain formation-controlling layer on the top side of the amorphous magnetic layer.

TABLE 9

| Sample No. | Laminate film | Coercive force (kOe) | Square ratio | Magnetic domain size (nm) | Distance between magnetic head and amorphous magnetic layer surface (nm) | Reproduction output (dB) at 60 Gb/inch$^2$ signal |
|---|---|---|---|---|---|---|
| 1 | Without deposition of magnetic domain formation-controlling layer | 1.6 | 0.6 | 160 | 10 | 10 |
| 33 | Magnetic domain formation-controlling layer deposited at the bottom side of amorphous magnetic layer | 2.8 | 0.88 | 35 | 10 | 43 |
| 501 | Magnetic domain formation-controlling layer deposited at the top side of amorphous magnetic layer | 2.81 | 0.85 | 32 | 20 | 30 |

As shown in Table 9, Sample No. 501 with deposition of the magnetic domain formation-controlling layer on the top side of the amorphous magnetic layer had improved magnetic properties, as compared with that without deposition of the magnetic domain formation-controlling layer and also had a substantially equivalent effect to that of the magnetic domain formation-controlling layer deposited at the bottom side of the amorphous magnetic layer, and also had an improved R/W characteristic, as compared with that without deposition of the magnetic domain formation-controlling layer, but had a somewhat poor R/W characteristics, as compared with that with deposition at the bottom side of the amorphous magnetic layer, because the distance between the magnetic head and the magnetic layer surface was as long as 20 nm.

It can be seen from the foregoing test results that the magnetic domain formation-controlling layer, even if deposited on the top side of the amorphous magnetic layer, is more effective than that without deposition of the magnetic domain formation-controlling layer, but is not so effective as that deposited on the bottom side of the amorphous magnetic layer. That is, the magnetic domain formation-controlling layer even if deposited on either the top side or the bottom side of the amorphous magnetic layer, has an improved R/W characteristic, as compared with Comparative Example, but the magnetic domain formation-controlling layer deposited on the bottom side of the amorphous magnetic layer has a better R/W characteristic than that deposited on the top side thereof.

According to the present invention, the magnetic domains of the amorphous magnetic layer can be brought into a finer structure under the influence of a magnet domain formation-controlling layer comprising a main phase and discrete spherical isolating phases arranged horizontally in lines in the main phase or discrete spherical isolating phases vertically stacked one upon another in the main phase, the magnetic domain formation-controlling layer being deposited on the top side or the bottom side of the amorphous magnetic layer.

According to the present invention, the magnetic domains of the amorphous magnetic layer can be brought into a much finer structure by the surface roughness or magnetic properties of the magnetic domain formation-controlling layer.

According to the present invention, the R/W characteristic can be much better by providing the magnetic head with a laser beam oscillator.

It will be further understood by those skilled in the art that the foregoing description has been made on embodiments of the invention and that various changes and modifications may be made in the invention without departing from the spirit of the invention and scope of the appended claims.

What is claimed is:

1. An amorphous magnetic recording medium, which comprises a substrate and a magnetic layer formed on the substrate directly or through at least one other layer, where a magnetic domain formation-controlling layer is provided on the top side or the bottom side of the magnetic layer directly or through at least one other layer, the magnetic domain formation-controlling layer comprising a main phase and 1 to 3 kinds of discrete spherical isolating phases arranged horizontally in lines in the main phase or 1 to 3 kinds of discrete spherical isolated phases vertically stacked one upon another in the main phase, and the magnetic layer is amorphous.

2. An amorphous magnetic recording medium according to claim 1, wherein the magnetic domain formation-controlling layer comprises a first oxide member selected from a group consisting of at least one of cobalt oxide, iron oxide and nickel oxide, and a second oxide member selected from a group consisting of at least one of silicon oxide, aluminum oxide, zinc oxide and titanium oxide.

3. An amorphous magnetic recording medium according to claim 1, wherein the magnetic recording medium has a surface average roughness Ra of 0.1 to 0.4 nm.

4. An amorphous magnetic recording medium according to claim 1, wherein the magnetic layer is composed of an amorphous alloy comprising a transition metal and a rare earth element.

5. An amorphous magnetic recording medium according to claim 1, wherein an intermediate layer for preventing oxygen diffusion from the magnetic domain formation-controlling layer to the magnetic layer is formed between the magnetic domain formation-controlling layer and the magnetic layer of the amorphous magnetic recording medium.

6. An amorphous magnetic recording medium, which comprises a substrate and a magnetic layer formed on the substrate or through at least one of other layers, where a magnetic domain formation-controlling layer is formed on the bottom side of the magnetic layer directly or through at least one of other layers and comprises 30 to 95% by weight of cobalt oxide, 30 to 2% by weight of silicon nitride and 40 to 3% by weight of titanium oxide, sum total being 100% by weight, and the magnetic layer is amorphous.

7. A process for producing an amorphous magnetic recording medium, which comprises a step of forming a magnetic domain formation-controlling layer on a substrate and a step of forming a magnetic layer, where the former step includes a step of forming a main phase and 1 to 3 kinds of discrete spherical isolating phases arranged horizontally in lines in the main phase or 1 to 3 kinds of discrete spherical isolating phases vertically stacked one upon another in the main phase and the latter step includes a step of forming an amorphous magnetic layer as the magnetic layer.

8. A process according to claim 7, wherein the magnetic domain formation-controlling layer is formed by etching.

9. A process according to claim 7, wherein the magnetic domain formation-controlling layer comprises a first oxide member selected from at least one of cobalt oxide, iron oxide and nickel oxide and a second oxide member selected from at least one of silicon oxide, aluminum oxide, zinc oxide and titanium oxide.

10. A magnetic recording and reproduction apparatus, which comprises a magnetic recording apparatus, a spindle for supporting the medium a spindle motor for rotating the spindle, a magnetic head for reading and writing information, a voice controller motor, VCM, for driving the magnetic head and a circuit for controlling said members, the magnetic recording medium comprising a substrate and a magnetic layer formed on the substrate directly or through at least one of other layers, where a magnetic domain formation-controlling layer is formed on the top side or the bottom side of the magnetic layer directly or through at least one of other layers, the magnetic domain formation-controlling layer comprising a main phase and 1 to 3 kinds of discrete spherical isolating phases provided in the main phase or 1 to 3 kinds of discrete spherical isolating phases vertically stacked one upon another in the main phase, and the magnetic layer is amorphous.

11. A magnetic recording and reproduction apparatus according to claim 10, wherein the magnetic head is provided with a laser beam oscillator and an objective lens for converging the laser beam.

12. A magnetic recording and reproduction apparatus, which comprises a magnetic recording medium, a spindle for supporting the medium, a spindle motor for rotating the spindle, a magnetic head for reading and writing information, VCM, for driving the magnetic head and a circuit for controlling said members, where the magnetic recording medium comprises a substrate and a magnetic layer formed on the substrate directly or through at least one of other layers, a magnetic domain formation-controlling layer comprising a first oxide member selected from at least one of cobalt oxide, aluminum oxide, zinc oxide and titanium oxide, and the magnetic layer is amorphous.

13. An amorphous magnetic recording medium according to claim 5, wherein said intermediate layer has a thickness of 0.5 to 5 nm.

14. An amorphous magnetic recording medium, which comprises a substrate and a magnetic layer formed on the substrate directly or through at least one other layer, where a magnetic domain formation-controlling layer is provided on the top side or the bottom side of the magnetic layer directly or through at least one other layer, the magnetic domain formation-controlling layer comprising a main phase and 1 to 3 kinds of discrete spherical isolating phases arranged horizontally in lines in the main phase or 1 to 3 kinds of discrete spherical isolated phases vertically stacked one upon another in the main phase, wherein the isolating phases of the magnetic domain formation-controlling layer have an average grain size of 1 to 3 nm in case of a layer thickness of 1 to 3 nm and 3 to 6 nm in case of a layer thickness of 3 to 15 nm, and a quotient obtained by dividing a standard deviation of grain sizes of the isolating phases by the average grain size is not more than 25%, and the magnetic layer is amorphous.

15. An amorphous magnetic recording medium, which comprises a substrate and a magnetic layer formed on the substrate directly or through at least one other layer, where a magnetic domain formation-controlling layer is provided on the top side or the bottom side of the magnetic layer directly or through at least one other layer, the magnetic domain formation-controlling layer comprising a main phase and 1 to 3 kinds of discrete spherical isolating phases arranged horizontally in lines in the main phase or 1 to 3 kinds of discrete spherical isolated phases vertically stacked one upon another in the main phase, the magnetic domain formation-controlling layer having a volume magnetic susceptibility of 50 to 200 (emu/cc) in an external magnetic field of 1 T, and the magnetic layer is amorphous.

16. An amorphous magnetic recording medium, which comprises a substrate and a magnetic layer formed on the substrate directly or through at least one other layer, wherein a magnetic domain formation-controlling layer is provided on the top side or the bottom side of the magnetic layer directly or through at least one other layer, the magnetic domain formation-controlling layer comprising a main phase and 1 to 3 kinds of discrete spherical isolating phases arranged horizontally in lines in the main phase or 1 to 3 kinds of discrete spherical isolated phases vertically stacked one upon another in the main phase, and the magnetic layer is amorphous, and wherein an intermediate layer for preventing oxygen diffusion from the magnetic domain formation-controlling layer to the magnetic layer is formed between the magnetic domain formation-controlling layer and the magnetic layer of the amorphous magnetic recording medium, the intermediate layer being a monolayer comprising any one of silicon, silicon nitride and aluminum nitride or a laminate thereof.

* * * * *